Figure 1:
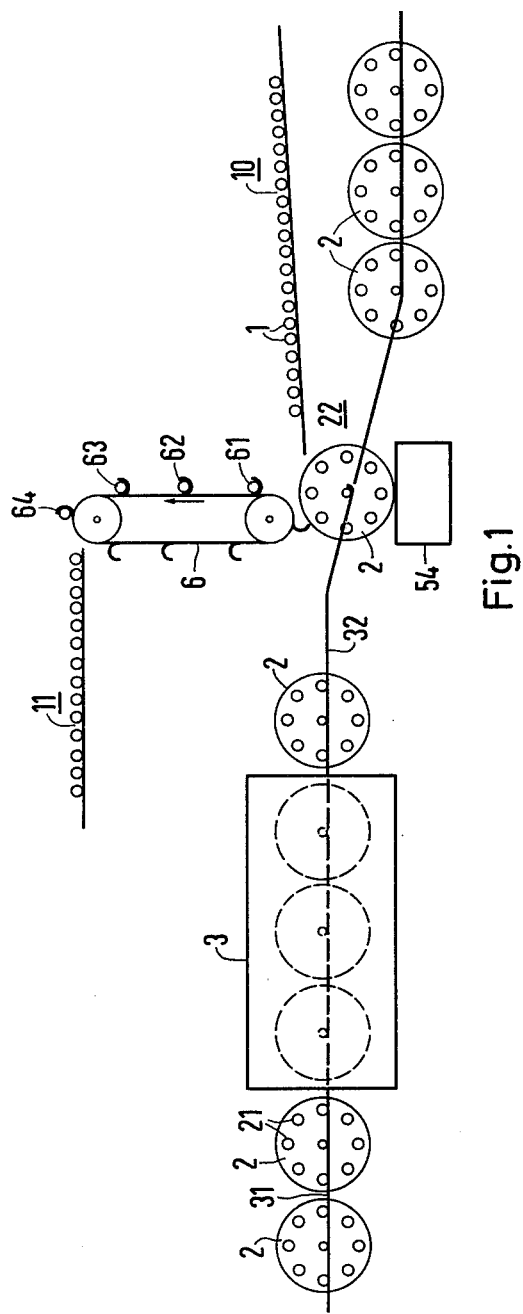

United States Patent [19]

Bezold

[11] 4,125,577
[45] Nov. 14, 1978

[54] METHOD OF AUTOMATICALLY FILLING NUCLEAR FUEL ROD JACKET TUBES

[75] Inventor: Helmut Bezold, Erlangen, Germany
[73] Assignee: Kraftwerk Union Aktiengesellschaft, Mülheim (Ruhr), Germany
[21] Appl. No.: 779,756
[22] Filed: Mar. 21, 1977
[30] Foreign Application Priority Data
Mar. 24, 1976 [DE] Fed. Rep. of Germany ....... 2612538
[51] Int. Cl.² .......................................... G21C 21/00
[52] U.S. Cl. ..................................... 264/0.5; 176/87; 29/422
[58] Field of Search ..................... 176/68, 76, 78, 87; 264/0.5; 29/422

[56] References Cited

U.S. PATENT DOCUMENTS

| | | | |
|---|---|---|---|
| 3,346,676 | 10/1967 | Hirose et al. | 264/0.5 |
| 3,677,958 | 7/1972 | Lonadier et al. | 264/0.5 X |
| 3,714,305 | 1/1973 | Davis et al. | 264/0.5 |
| 3,754,059 | 8/1973 | Prantl et al. | 264/0.5 |
| 3,763,292 | 10/1973 | Stradley et al. | 264/0.5 |

Primary Examiner—Peter A. Nelson

Attorney, Agent, or Firm—Herbert L. Lerner

[57] ABSTRACT

Method of automatically filling jacket tubes for fuel rods of nuclear reactors with nuclear fuel pellets in combination with subsequent closure of the jacket tubes by automated welding of end caps thereon, which includes introducing the nuclear fuel pellets row-wise into a receiving tube of a collecting magazine therefor, passing the magazine containing the nuclear fuel pellets through a drying furnace to remove traces of moisture therefrom, subsequently delivering the magazine containing the moistureless nuclear fuel pellets to a filling station to which, respectively, an empty jacket tube has been fed from a tube magazine, weighing the empty jacket tube, then filling the empty jacket tube with fuel pellets in a column from the receiving tubes of the collecting magazine by mechanically displaced pushrods until a given extent of fullness thereof depending upon the length and weight of the pellet column has been attained, delivering the filled jacket tube to a further processing station for introducing insulating tablets, support sleeves and springs thereto and, after final checking, transferring the jacket sleeve to welding apparatus for welding end caps thereon.

2 Claims, 2 Drawing Figures

METHOD OF AUTOMATICALLY FILLING NUCLEAR FUEL ROD JACKET TUBES

The invention relates to a method of automatically filling jacket tubes for fuel rods of nuclear reactors with nuclear fuel pellets or tablets in combination with the subsequent closure thereof by automatized welding of end caps thereon.

Nuclear reactor fuel rods, which can have a length of several meters, are formed, as is well known, of a jacket tube, preferably consisting of a zirconium alloy, which is filled with nuclear fuel pellets and has end caps gas-tightly welded thereto at both ends thereof. Between the nuclear fuel charge and the end caps, there is generally located a fission-gas collecting chamber in the region of which, the thin jacket tube is reinforced by a support sleeve which is shoved into the jacket tube. Furthermore, ceramic insulating pellets or tablets can be provided at the ends of the fuel column and, moreover, it is conventional to maintain the nuclear-fuel pellet column in constant mutual contact by means of a spring inside the fission-gas collecting chamber.

The assembly of such a fuel rod, including the welding of the end caps thereon has heretofore required great manual dexterity or skill; only limited mechanical devices such as pellet sorting machines, for example, could be used.

Since the closure practice or operation for jacket tubes was able to be greatly shortened in time and automated, in the interim through resistance pressure welding, the urgent need developed for also automatizing the steps of filling the fuel rod, which preceded the welding operation, so that, with the subsequent pressure welding of the end caps, a production line for fuel rods is capable of being installed. In this production line, the possibility is supposed to have been afforded of drying the fuel pellets so that they can be introduced into the jacket tubes with the least possible moisture content.

With the foregoing and other objects in view, there is provided, in accordance with the invention, a method of automatically filling jacket tubes for fuel rods of nuclear reactors with nuclear fuel pellets in combination with subsequent closure of the jacket tubes by automated welding of end caps thereon, which comprises introducing the nuclear fuel pellets row-wise into a receiving tube of a collecting magazine therefor, passing the magazine containing the nuclear fuel pellets through a drying furnace to remove traces of moisture therefrom, subsequently delivering the magazine containing the moistureless nuclear fuel pellets to a filling station to which, respectively, an empty jacket tube has been fed from a tube magazine, weighing the empty jacket tube, then filling the empty jacket tube with fuel pellets in a column from the receiving tubes of the collecting magazine by mechanically displaced pushrods until a given extent of fullness thereof depending upon the length and weight of the pellet column has been attained, delivering the filled jacket tube to a further processing station for introducing insulating tablets, support sleeves and springs thereto and, after final checking, transferring the jacket sleeve to welding apparatus for welding end caps thereon.

In accordance with another mode of the method invention and depending upon the length of the jacket tubes or the time period required for filling the jacket tubes with nuclear fuel pellets, the method comprises welding with the welding apparatus end caps on jacket tubes delivered thereto from more than one jacket-tube filling device wherein the preceding steps of the method are performed. Other features which are considered as characteristic for the invention are set forth in the appended claims.

Although the invention is illustrated and described herein as embodied in a method for automatically filling nuclear fuel rod jacket tubes, it is nevertheless not intended to be limited to the details shown, since various modifications may be made therein without departing from the spirit of the invention and within the scope and range of equivalents of the claims.

Figure 2:
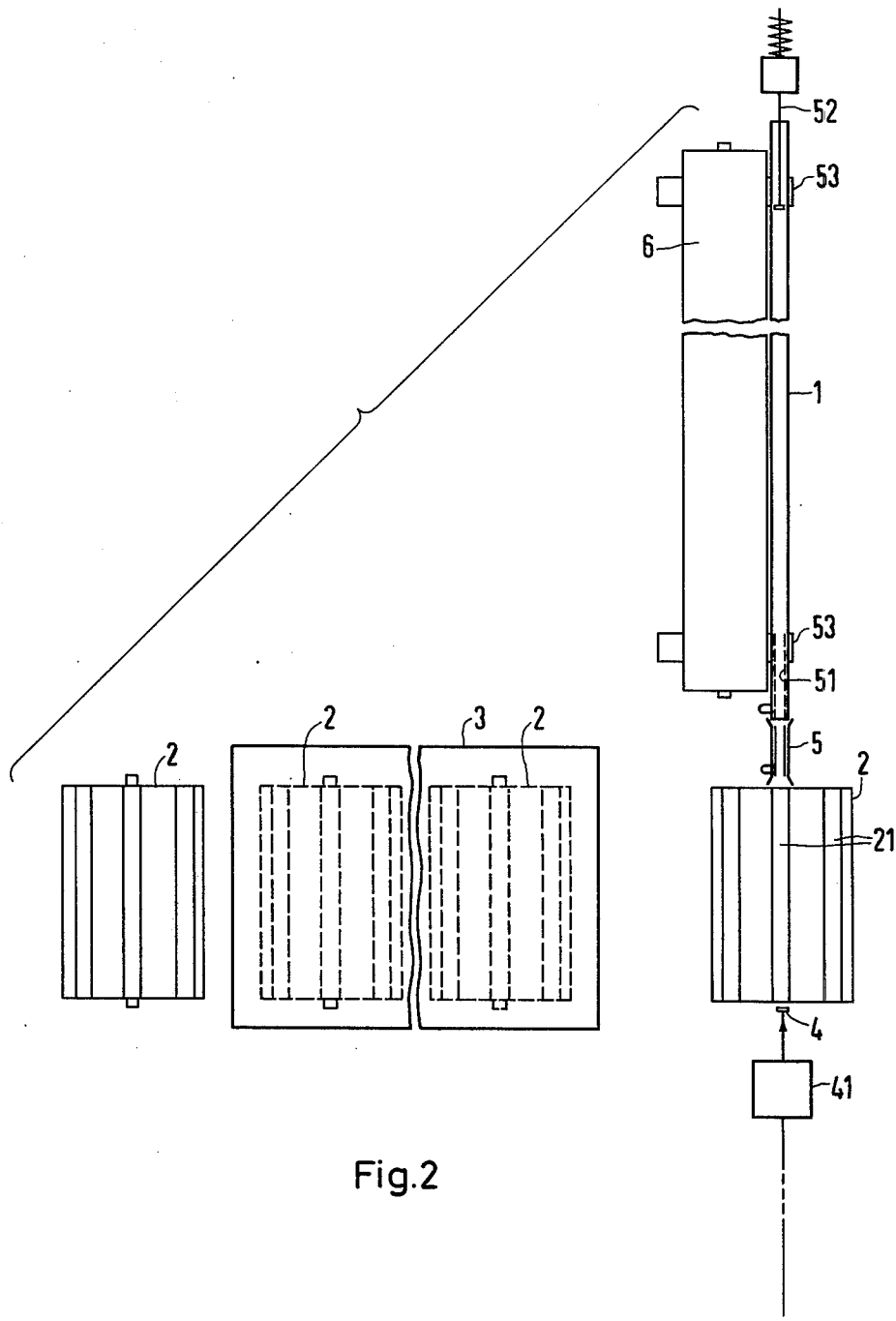

The invention, however, together with additional objects and advantages thereof will be best understood from the following description when read in connection with the accompanying drawings, in which:

FIG. 1 is a diagrammatic elevational view of apparatus for carrying out the method of automatically filling nuclear fuel rod jacket tubes in accordance with the invention; and FIG. 2 is a fragmentary enlarged top plan view of FIG. 1 showing that part of the apparatus at the left-hand side thereof.

Referring now to the figures of the drawing, there are shown nuclear fuel pellets which are initially fed in a non-illustrated manner, into storage or magazine tubes 21 of a storage or magazine drum 2, for example, with the aid of a conventional vibratory feeder. The filled magazine drums 2 are then placed on a conveyor track 31 that is formed of a rail system with which, for example, runners that are rotatably mounted on the magazine axis are in engagement. Without being themselves turned thereby, these magazine drums 2 arrive in a drying furnace 3 which is electrically heated, for example. During their travel therethrough, the magazine drums 2 are subject to an air-shutoff, and the nuclear fuel pellets accordingly lose residual moisture. In virtually cooled-off condition, the drums 2 then travel over the track 32 to the filling station 22. The drum magazines 2 are preferably constructed so that the magazine tubes 21, after leaving the furnace 3, are closed on both sides thereof, and that in the filling station 22, the respective magazine tube that is to be emptied is opened. This can occur, for example, through cover discs that are disposed endwise i.e. face-to-face on the magazine with a respective bore at the level of the machine tube. In the filling station 22, the cover discs remain in place while the drum magazine per se is further rotated, respectively, step-by-step through one magazine tube-division for the unloading thereof.

Empty jacket tubes 1 that are open on both sides thereof are fed from a jacket-tube magazine 10 to the unloading station 22. They are seized and clamped tightly thereat, for example, by a take-up device 53 which is simultaneously connected to a non-illustrated weighing mechanism which registers the exact tare weight thereof. The jacket tube 1 that is to be loaded is then located exactly at the level of the magazine tube 21 of the drum 2 that is to be unloaded. Between both tubes 1 and 21, a connecting filling chamber 5 is located having an inner gripping device 51. A device 54 takes care of the rotating of the magazine drum 2 as well as the blocking or stopping thereof during the filling cycle.

After production of this layer, a filling plunger 4, which is displaced by a suitable drive or transmission 41, travels into the magazine tube 21 and presses or shoves the column of nuclear fuel pellets located therein through the filling chamber 5 into the jacket tube 1. At the other end of the jacket tube 1, a sensing plunger 52 has driven into the tube 1 in the interim. The sensing plunger 52 has the characteristics of a terminal switch and transmits a signal when the nuclear fuel pellets have reached the other end of the jacket tube 1.

After the first magazine tube 21 has been emptied, the filling plunger 4 withdraws. The magazine drum 2 turns through another division. The next magazine tube 21 is emptied and so on until, as mentioned hereinbefore, the fuel pellets have reached the other end of the jacket tube 1. The signal of the terminal switch 52 stops the movement of the filling plunger 4, and the gripper 51 located in the filling chamber 5 shoves the remaining pellets present in this chamber 5 into the jacket tube 1, the sensing device 52 at the other end correspondingly yielding or giving way. The response or operating point of the sensing device 52 has been set so that after the pellets remaining yet in the filling chamber 5 have been shoved into the jacket tube 1, the required spacing of the pellet column from the end of the jacket tube 1 remains.

The jacket tube 1 that has been filled in the foregoing manner is then taken possession of by a transport mechanism 6 having the construction, for example, of a wide conveyor belt, and is advanced into the next work station 61 wherein ceramic insulating pellets, supporting sleeves for the fission-gas collecting chamber as well as springs are introduced. Naturally, these operating steps can also be partly carried out in the next station 62. Then, the conveyor mechanism 6 delivers the filled jacket tube 1 into a control station 63 wherein again the presence of all the introduced parts and the seating or fit thereof in the jacket tube 1 are checked.

Thereafter, the conveyor device 6 brings the filled jacket tube 1 into a welding station 64 which can, for example, have the same construction as that described in my copending application Ser. No. 739,640, filed Nov. 8, 1976. In this copending application, welding is effected simultaneously at both sides of the end caps of the jacket tube and, in fact, through the briefest possible resistance pressure welding. The completed fuel rods then leave the last-mentioned station and are delivered into a collection magazine 11.

The sequence of these individual steps of the method of the invention are so synchronized one with the other, that the filling cycle lasts exactly as long as does the welding cycle. The welding cycle includes not only the welding time per se but also, above all, in addition to the feed cycle for the end caps, the evacuation of the rods as well as the filling thereof with the so-called advance inner pressure.

Of course, other construction possibilities exist with respect to the magazine and the filling device as well as the transport or conveyor device 6. The particular structure thereof will have been dictated essentially by the length of the fuel rods to be produced as well as by the spatial relationships that are available and by the other manufacturing devices.

The course of this process ensures that the subsequently dried nuclear fuel pellets cannot absorb practically any moisture again on the transport path thereof, especially since the possibility is additionally afforded of electrically heating to such an extent, by means of the clamping device 53 during the filling process, the respective jacket tube that is to be filled, that moisture accumulations condense on the inside of the tube.

The hereinaforementioned weighing device also determines the final weight of the fuel rod so that the weight of the introduced fuel pellets for each individual fuel rod is exactly registered. In this manner, it is also possible always to maintain constant not only the length but also the weight of the nuclear fuel charge. If differences should occur in the length of the nuclear fuel column, they are then compensated for by additional insulating pellets in a conventional manner.

What is essential to the entire course of the process of the invention is that the operating or servicing personnel must devote themselves only to monitoring duties and, therefore, the number of employees can be kept low as compared to the number required with the technique employed heretofore. Assurance is thereby also provided that the end product, the filled nuclear reactor fuel rod, cannot only be produced in a considerably shorter time but also is always of the same quality.

There are claimed:

1. Method of automatically filling jacket tubes for fuel rods of nuclear reactors with nuclear fuel pellets in combination with subsequent closure of the jacket tubes by automated welding of end caps thereon, which comprises introducing the nuclear fuel pellets row-wise into a receiving tube of a collecting magazine therefor, passing the magazine containing the nuclear fuel pellets through a drying furnace to remove traces of moisture therefrom, subsequently delivering the magazine containing the moistureless nuclear fuel pellets to a filling station to which, respectively, an empty jacket tube has been fed from a tube magazine, weighing the empty jacket tube, then filling the empty jacket tube with fuel pellets in a column from the receiving tubes of the collecting magazine by mechanically displaced pushrods until a given extent of fullness thereof depending upon the length and weight of the pellet column has been attained, delivering the filled jacket tube to a further processing station for introducing insulating tablets, support sleeves and springs thereto and, after final checking, transferring the jacket sleeve to welding apparatus for welding end caps thereon.

2. Method according to claim 1 which comprises welding with the welding apparatus end caps on jacket tubes delivered thereto from more than one jacket-tube filling device wherein the preceding steps of the method are performed.

* * * * *